United States Patent
Flockhart et al.

(10) Patent No.: US 6,766,014 B2
(45) Date of Patent: Jul. 20, 2004

(54) CUSTOMER SERVICE BY BATCH

(75) Inventors: Andrew D. Flockhart, Thornton, CO (US); Keith Robert McFarlane, Pleasanton, CA (US); Lucinda M. Sanders, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 574 days.

(21) Appl. No.: 09/756,955

(22) Filed: Jan. 9, 2001

(65) Prior Publication Data

US 2002/0118816 A1 Aug. 29, 2002

(51) Int. Cl.[7] .......................... H04M 3/523; H04M 3/56
(52) U.S. Cl. ........................ 379/265.12; 379/202.01; 379/207.01
(58) Field of Search ............... 379/202.01, 207.01, 379/265.01, 265.02, 265.09, 265.11, 265.12, 265.13, 266.01, 266.05

(56) References Cited

U.S. PATENT DOCUMENTS

| | | | | |
|---|---|---|---|---|
| 5,206,903 A | * | 4/1993 | Kohler et al. ........... | 379/265.12 |
| 5,335,269 A | * | 8/1994 | Steinlicht ............... | 379/266.05 |
| 5,721,770 A | * | 2/1998 | Kohler ................... | 379/265.12 |
| 6,088,441 A | * | 7/2000 | Flockhart et al. ....... | 379/265.12 |
| 6,389,132 B1 | * | 5/2002 | Price ...................... | 379/265.01 |

* cited by examiner

Primary Examiner—Harry S. Hong
(74) Attorney, Agent, or Firm—David Volejnicek

(57) ABSTRACT

In a customer contact center (100), a plurality of customers' communications are serviced simultaneously by one resource (120–128) (agent or port). A conferencing function (136) connects the plurality of customers (110–118) to the one resource and/or to each other. When a resource becomes available, a batch service function (140) determines (206–226), for each skill of the resource, the value to the contact center of having the resource presently serve communications needing that skill, and uses the conferencing function to conference (234–236) a plurality of communications needing the skill having the highest value with the resource. The conference connection may be listen-only, listen-and-talk, or listen-only/then listen-and-talk.

20 Claims, 2 Drawing Sheets

CUSTOMER SERVICE BY BATCH

TECHNICAL FIELD

This invention relates to customer relationship management and to customer contact centers.

BACKGROUND OF THE INVENTION

A customer contact center typically must balance the quality of service that it provides against the cost of providing such service. When personalized service is needed, an automatic call distribution system typically connects a customer to a contact center agent who has the skills that are needed to service the customer. The agent serves one customer at a time. This personalized treatment generally leads to a high quality of service, with the main limitation on the quality of service being the number of available agents, but it is very expensive. To reduce costs, many contact centers offer some form of automated self-service, such as an interactive voice response (IVR) system, to customers. Each customer is connected to a separate port of the IVR system for service. The cost of providing service via the IVR system is generally substantially lower, but a desirable quality of service is not always achieved, as the IVR system is not as flexible and responsive as a human agent. Moreover, some customers are reluctant to use such systems.

SUMMARY OF THE INVENTION

This invention is directed to solving these and other problems and disadvantages of the prior art. Generally according to the invention, a plurality (a batch) of customers are simultaneously connected to and serviced by a resource such as an agent or an IVR port. According to one aspect of the invention, in a customer contact center where customer's communications are distributed for servicing among resources based on skills needed by the communications and possessed by the resources, an improvement comprises responding to a plurality of the communications needing a same said skill by connecting the plurality of the communications for servicing simultaneously to one said resource. According to another aspect of the invention, an automated communications distribution (ACD) system distributes customers' communications for servicing among resources based on skills needed by the communications and possessed by the resource, and responds to a plurality of the communications needing a same said skill by connecting the plurality of the communications for servicing simultaneously to one said resource having the skill. According to yet another aspect of the invention, a method of servicing customers' communications in a customer contact center comprises distributing customers' communications for servicing among resources based on skills needed by the communications and possessed by the resources, and in response to a plurality of the communications needing a same said skill, connecting the plurality of the communications for servicing simultaneously to one of said resources having said skill.

Although the invention may not be appropriate for use in all customer service applications, it is particularly useful in situations where the communication primarily involves dissemination of information by the resource to the customer with limited customer-to-resource interaction. Also, for scenarios where personalized service is prohibitively expensive but automated self-service leads to customer dissatisfaction and defections, this approach may offer an effective compromise. For those applications to which it is suited, the invention provides a level of personalized service at a dramatically reduced cost. For example, an application that allows an agent to effectively handle three customers per batch is estimated to cut total cost per contact by around 50%.

While the invention has been characterized in terms of method, it also encompasses apparatus that performs the method. The apparatus preferably includes an effector—any entity that effects the corresponding step, unlike a means— for each step. The invention further encompasses any computer-readable medium containing instructions which, when executed in a computer, cause the computer to perform the method steps.

These and other features and advantages of the invention will become more apparent from a consideration of an illustrative embodiment of the invention taken together with the drawing.

DETAILED DESCRIPTION

Figure 1:
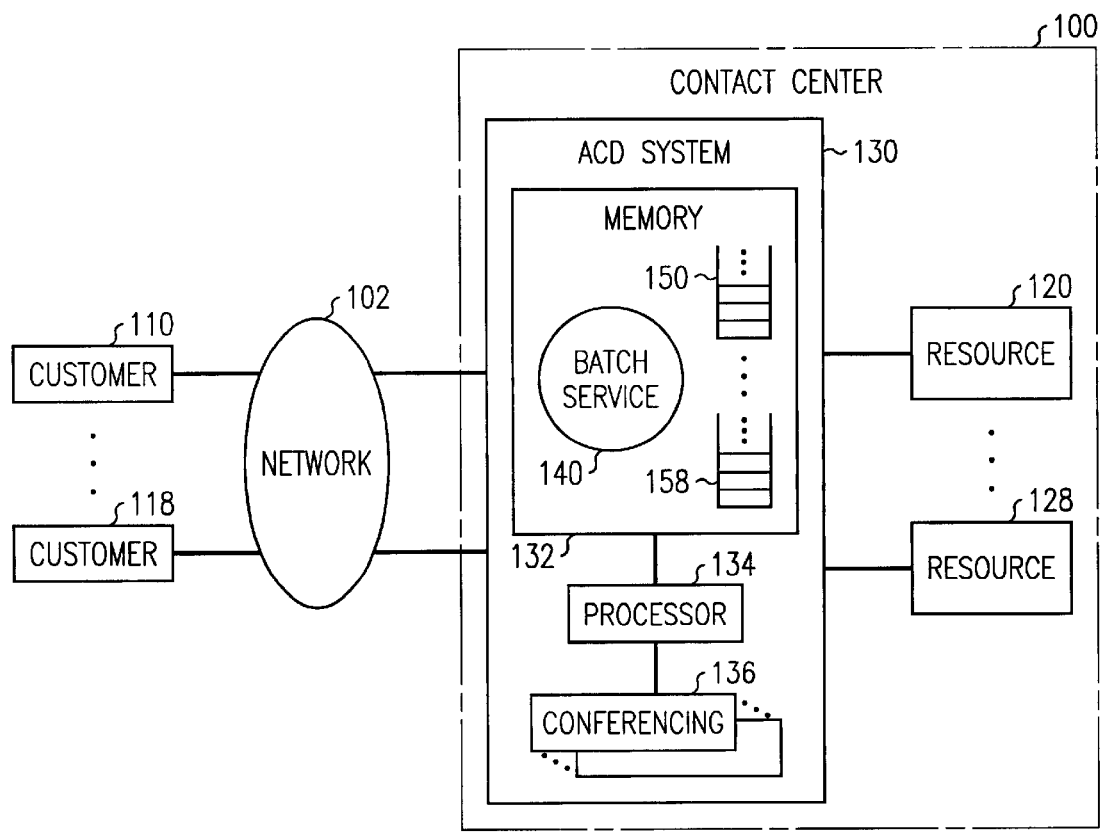
FIG. 1 is a block diagram of a communications system that includes a first illustrative embodiment of the invention.

FIG. 1 shows a communications system comprising a customer contact center 100 that is connected with a plurality of customers 110–118 via a communications network 102. Illustratively, customers 110–118 comprise the customers' communications terminals, such as telephones or telephony-enabled personal computers, and network 102 comprises the public telephone network or a data network such as the Internet. Contact center 100 comprises a plurality of resources 120–128 for servicing customer contacts, such as human agents and IVR ports, that are connected to network 102 by an automatic call distribution (ACD) system 130. ACD system 130 distributes communications of customers 110–118 among, and connects customers' communications to, resources 120–128 for servicing. ACD system 130 is a stored-program-controlled machine comprising at least one memory 132 for storing control programs and data and a processor 134 for executing programs and using data from memory 132. ACD system 130 is illustratively the Definity® enterprise communications system of Avaya Inc., and includes one or more conferencing functions 136, such as conference circuits, conference software, and/or a multi-point conferencing unit (MCU). As described so far, the communications system of FIG. 1 is conventional.

According to the invention, a conferencing function 136 is employed to provide batch service by simultaneously connecting a plurality of customers 110–118 to one resource 120–128 and/or to each other. The one resource 120–128 may be a human agent, or an automated resource such as an IVR port, or even a null resource (e.g., a conference connection between customers 110–118 only, with the customers acting as each others' resources). The connection between the batch of customers 110–118 and the one resource 120–128 may be listen-and-talk, or listen-only, or listen-only/then listen-talk. The conference connection with a plurality of customers 110–118 may be established immediately at the start of the one resource 120–128 commencing to provide service, or the one resource 120–128 may start providing service to only one or some of the customers 110–118 and the other customers 110–118 may be conferenced in later. Also, the batch of customers 110–118 may first be conferenced together before the one resource 120–128 is conferenced in. The conference connection may also be ongoing, with new customers 110–118 being conferenced in as previously-conferenced customers 110–118 drop out. The services that may be provided via batch service are varied. For example, customers 110–118 may listen to various types of information, such as the latest interest rates, stock market quotes, investment recommendations, music offerings, product descriptions, etc. In a listen-and-talk connection, the conferenced customers 110–118 may then discuss the received information with each other, or ask questions of the resource. Illustratively, one or more of the customers 110–118 themselves can function as the resource 120–128 and answer questions or provide further information.

Figure 2:
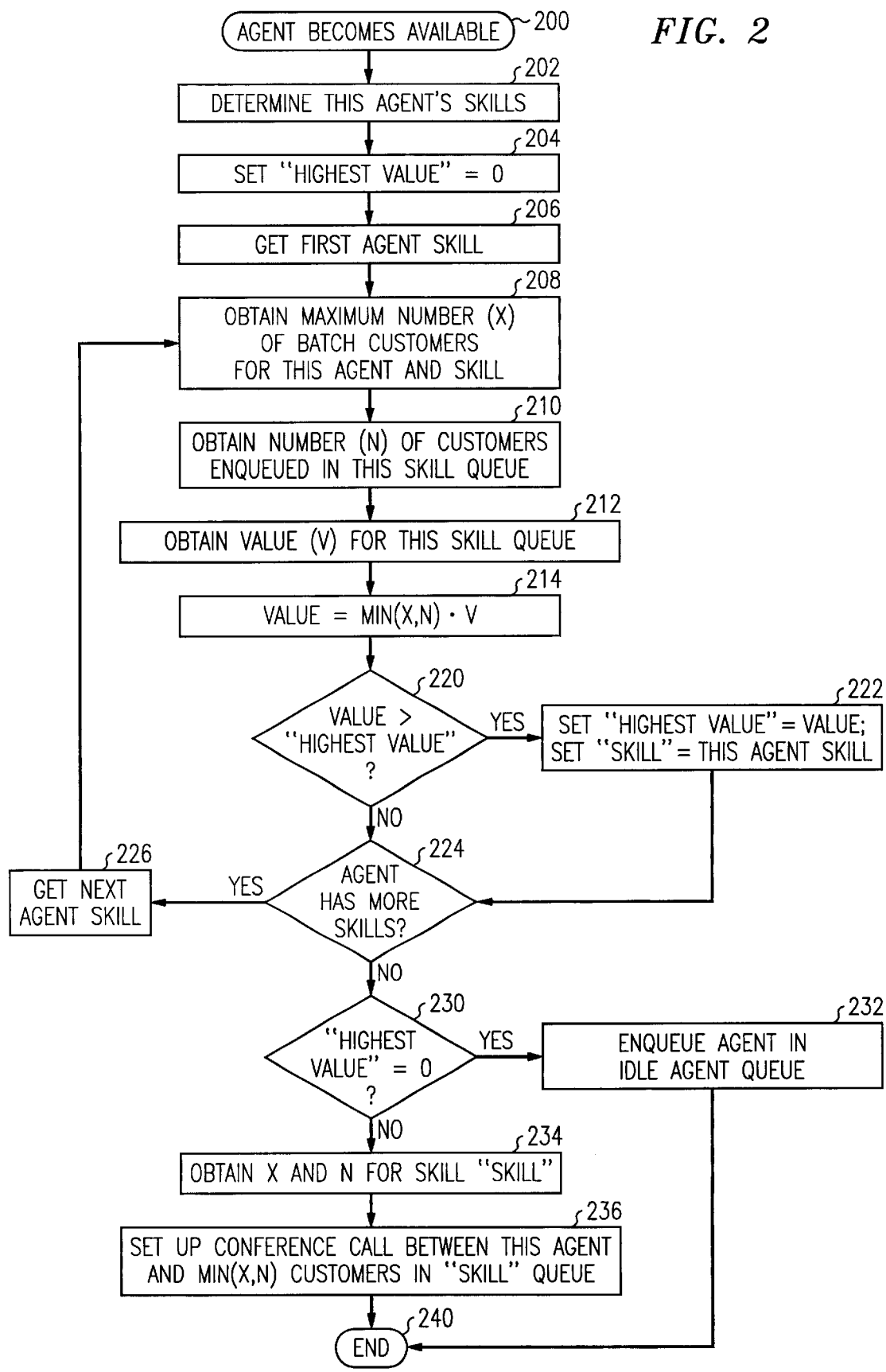
FIG. 2 is a flow diagram of operation of a batch service function of the system of FIG. 1.

The customer service by batch is provided by a batch service function of ACD system 130. A batch service function 140 in this illustrative embodiment is implemented as software instructions that are stored in memory 132. Its operation is shown in FIG. 2.

Execution of batch service function 140 is invoked by an agent becoming available to service a customer 110–118, i.e., a communication from a customer 110–118, at step 200. Function 140 determines this agent's skills from the agent's profile, at step 202, and uses this information in the subsequent steps to select the one of a plurality of queues 150–158 of customers (or more precisely, customers' communications) that are waiting to be serviced and whose servicing by the agent will produce the most value to contact center 100. Function 140 initializes a "highest value" variable to zero, at step 204. It then selects a first skill of the agent, at step 206, and determines the maximum number (X) of customers for this agent and this skill (queue 150–158) that can be served in batch (simultaneously), at step 208. X is determined as the smaller of (a) the maximum number of batch customers for this agent, as specified by the agent's profile, and (b) the maximum number of batch customers for this skill, as specified by the skill's profile. Function 140 then determines the number (N) of customers that are enqueued in this skill's queue 150–158, at step 210, and retrieves from records of ACD system 130 the value (V) that is assigned to items that are enqueued in this skill's queue 150–158, at step 212. It then determines the value (VALUE) of having this agent service this queue, as V multiplied by the smaller (min) of X and N, at step 214. An alternative, more sophisticated, value-determining scheme is to have a value (Vi) associated with each item (i) in the queue 150–158, and to determine VALUE as $$Value = \sum_{i=1}^{min(X,N)} Vi.$$

Function 140 then checks whether the just-determined VALUE is greater than "highest value", at step 220. If so, function 140 sets "highest value" to the just-determined VALUE, and sets a variable "skill" to identify the presently-selected agent skill, at step 222. If not, or following step 222, function 140 checks whether there are more skills of the agent for it to select and process, at step 224. If so, function 140 selects a next skill of the agent, at step 226, and returns to step 208. If not, function 140 checks if "highest value" is zero, at step 230. If so, there are no enqueued items for the agent to service, and so function 140 enqueues the agent in an idle agent queue, at step 232, and ends its operation, at step 240. If "highest value" is not zero, function 140 again determines X and N for the skill identified by variable "skill", at step 234, in the manner described for steps 208 and 210. Function 140 then uses one of the conferencing functions 136 to set up a conference call between the agent and the first X or N customers—whichever is smaller—that are enqueued in the queue 150–158 of the skill identified by "skill", at step 236. Function 140 then ends its operation, at step 240, and further activity proceeds conventionally.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims except insofar as limited by the prior art.

What is claimed is:

1. In a customer contact center having
means for distributing customers' communications for servicing among resources based on skills needed by the communications and possessed by the resources, the improvement comprising:
means responsive to a plurality of the communications needing a same said skill, for connecting the plurality of the communications for servicing simultaneously to one said resource having said skill.

2. The improvement of claim 1 wherein:
the connecting means comprise
a conferencing means for conferencing the plurality of the communications with the resource.

3. The improvement of claim 1 wherein;
the resource is a human agent.

4. The improvement of claim 1 wherein:
the resource is a single port of an automated communications servicing arrangement.

5. The improvement of claim 1 wherein:
the communications are voice calls.

6. The improvement of claim 1 wherein:
the resource has a plurality of said skills; and
the connecting means comprise
means for determining, for each of the skills, a value to the customer contact center of having the resource presently service communications needing that skill, and
means responsive to the determining means, for connecting to the resource a plurality of said communications needing the skill having a highest said value.

7. An automated communications distribution (ACD) system comprising:
an effector of distributing customers' communications for servicing among resources based on skills needed by the communications and possessed by the resources; and
an effector, responsive to a plurality of the communications needing a same said skill, of connecting the plurality of the communications for servicing simultaneously to one said resource having said skill.

8. The ACD system of claim 7 wherein:
the effector of connecting comprises
a conferencing arrangement for conferencing the plurality of the communications with the resource.

9. The ACD system of claim 7 wherein:
the resource is a human agent.

10. The ACD system of claim 7 wherein:
the resource is a single port of an automated communications-servicing arrangement.

11. The ACD system of claim 7 wherein:
the communications are voice calls.

12. The ACD system of claim 7 wherein:
the resource has a plurality of said skills; and
the effector of connecting comprises
- an effector of determining, for each of the skills, a value to the customer contact center of having the resource presently service communications needing that skill, and
- an effector, responsive to the effector of determining, of connecting to the resource a plurality of said communications needing the skill having a highest said value.

13. A method of servicing customers' communications in a customer contact center comprising:
- distributing customers' communications for servicing among resources based on skills needed by the communications and possessed by the resources; and
- in response to a plurality of the communications needing a same said skill, connecting the plurality of the communications for servicing simultaneously to one said resource having said skill.

14. The method of claim 13 wherein:
connecting comprises
conferencing the plurality of the communications with the resource.

15. The method of claim 13 wherein:
the resource is a human agent.

16. The method of claim 13 wherein:
the resource is a single port of an automated communications-servicing arrangement.

17. The method of claim 13 wherein:
the communications are voice calls.

18. The method of claim 13 wherein:
the resource has a plurality of said skills and;
connecting comprises
- determining, for each of the skills, a value to the customer contact center of having the resource presently service communications needing that skill, and
- in response to the determining, connecting to the resource a plurality of said communications needing the skill having a highest said value.

19. An apparatus that performs the method of one of the claims 13–18.

20. A computer-readable medium containing software which, when executed in a computer, causes the computer to perform the method of one of the claims 13–18.

* * * * *